United States Patent [19]

Beppu

[11] Patent Number: 5,311,904
[45] Date of Patent: May 17, 1994

[54] VALVE WITH FUNCTION TO PREVENT STAGNANTS WATER

[75] Inventor: Takashi Beppu, Saitama, Japan

[73] Assignee: Organo Corporation, Tokyo, Japan

[21] Appl. No.: 77,083

[22] Filed: Jun. 16, 1993

[30] Foreign Application Priority Data

Jun. 16, 1992 [JP] Japan ................. 4-047640[U]
Apr. 27, 1993 [JP] Japan ................. 5-122155

[51] Int. Cl.⁵ .................................... F16K 5/06
[52] U.S. Cl. .......................... 137/561 R; 137/269
[58] Field of Search .............. 137/561 R, 239

[56] References Cited

U.S. PATENT DOCUMENTS

| 784,937 | 3/1905 | Griswold | 137/239 X |
|---|---|---|---|
| 3,481,365 | 12/1969 | Keen | 137/561 R |
| 3,557,820 | 1/1971 | Jackson et al. | 137/239 X |

FOREIGN PATENT DOCUMENTS

1022413  3/1966  United Kingdom .

Primary Examiner—John Fox
Attorney, Agent, or Firm—Oblon, Spivak, McClelland, Maier & Neustadt

[57] ABSTRACT

It is an object of the present invention to provide a valve having a function of preventing liquid from stagnating in a branch pipe connected to a main pipe and or in the valve provided for the branch pipe when the valve is closed. The valve is characterized in that a diversion member which can divert the flow of liquid is inserted in a liquid passageway in the valve case connected to an end portion of the branch pipe in such a manner that the end portion of the diversion member extends into the main pipe.

1 Claim, 6 Drawing Sheets

VALVE WITH FUNCTION TO PREVENT STAGNANTS WATER

BACKGROUND OF THE INVENTION

1. Field of the Invention

This invention relates to a valve provided for a branch pipe connected to a main pipe, and more particularly to a valve having a function that prevents liquid from stagnating in the branch pipe and the valve when the valve is closed.

2. Description of the Related Art

In order to collect ultra pure water flowing through a main pipe of a ultra pure water production line used, for example, in the semiconductor industry, a branch pipe is connected to the main pipe and a valve is provided for the branch pipe so that ultra pure water is collected from the main pipe by opening the valve.

Figure 1:
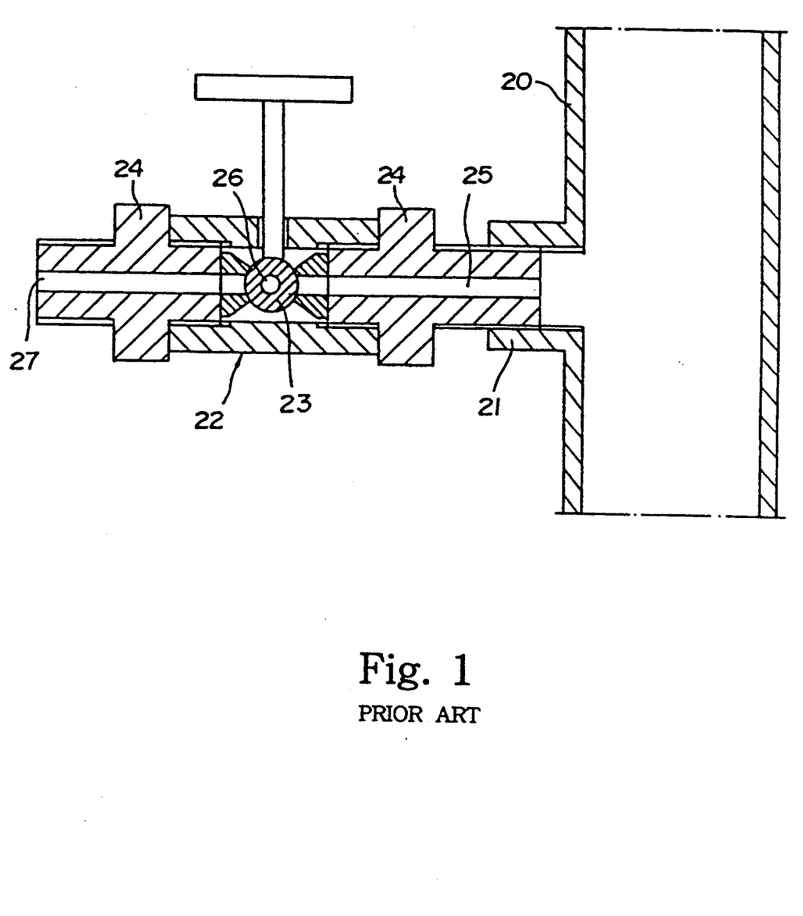
FIG. 1 is a sectional view showing an example of a valve of conventional type attached to a branch pipe.

FIG. 1 is a view showing an example of a conventional water collecting or sampling (hereinafter referred to as collecting) valve attached to a main pipe.

In FIG. 1, reference numeral 20 denotes a main pipe, 21 denotes a branch pipe connected to the main pipe 20, and 22 denotes a valve attached to an end portion of the branch pipe 21. In a conventional collecting valve, when the valve ball 23 in the valve 22 is opened, ultra pure water flowing in the main pipe 20 is introduced into a passageway 25 in the valve case 24 and into a flow passageway 26 provided in the valve 23 to allow to collect ultra pure water from the end opening 27 of the valve case 24.

In order to collect ultra pure water flowing in the main pipe 20 to the outside as described above, a valve 22 is provided for the branch pipe 21 connected to the main pipe 20, which valve can be opened or closed.

However, in the case of a valve of the conventional structure, when the valve ball 23 is closed, ultra pure water will stagnate in the branch pipe 21 and passageway 25 in the valve case 24, thereby allowing bacteria to proliferate or small particles to be deposited. Upon resuming the water collection, the stagnant water containing these contaminants will flow out first, and accordingly, there is a problem in that ultra pure water collected must first be blown down and discarded.

What is worse, the stagnation of ultra pure water has an adverse effect upon ultra pure water which flows through the main pipe 20.

Therefore, the present invention has been made to eliminate the problems of valves of the conventional type described above, and it is an object of the present invention to provide a valve with a function to prevent the stagnation of liquid so as to prevent proliferation of bacteria and deposition of small particles by constructing the valve such that, even when the valve is closed, the liquid does not stagnate in the branch pipe nor in the valve but is allowed to flow continuously therein.

SUMMARY OF THE INVENTION

In order to attain the object described above, according to an aspect of the present invention, there is provided a valve provided for a branch pipe connected to a main pipe, the valve having a function such that liquid is prevented from stagnating in the branch pipe or in the valve, the valve being characterized in that a diversion member is mounted in a flow passageway in a valve case connected to an end portion of the branch pipe in such a manner as to divide the inside of the passageway of the liquid into a plurality of chambers along the flow of the liquid, and an end portion of the diversion member extends into the main pipe.

According to another aspect of the present invention, there is provided a valve provided for a branch pipe connected to a main pipe, the valve having a function such that liquid is prevented from stagnating in the branch pipe and in the valve, the valve being characterized in that a diversion member is mounted in a flow passageway in a valve case connected to an end portion of the branch pipe in such a manner as to divide the inside of the passageway for the liquid into a plurality of chambers along the flow of the liquid, and an end portion of the diversion member extends into the main pipe, and a flow passageway is formed in the valve ball which allows liquid to flow in the valve ball when the valve ball in the valve case is closed.

With any of the above-described valves of the present invention, a bypass flow passageway is formed such that liquid flowing in the main pipe flows under the guidance of a diversion member through the branch pipe and the liquid passageway provided in the valve and then back into the main pipe even when the valve ball is closed, and accordingly, liquid will not stagnate within the valve or branch pipe at all, thereby effectively preventing the possible proliferation of bacteria and the deposition of small particles.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

The construction of a valve having a function to prevent liquid stagnation according to the of preventing invention will hereinafter be described in detail in connection with the embodiments shown in the drawings.

Figure 2:
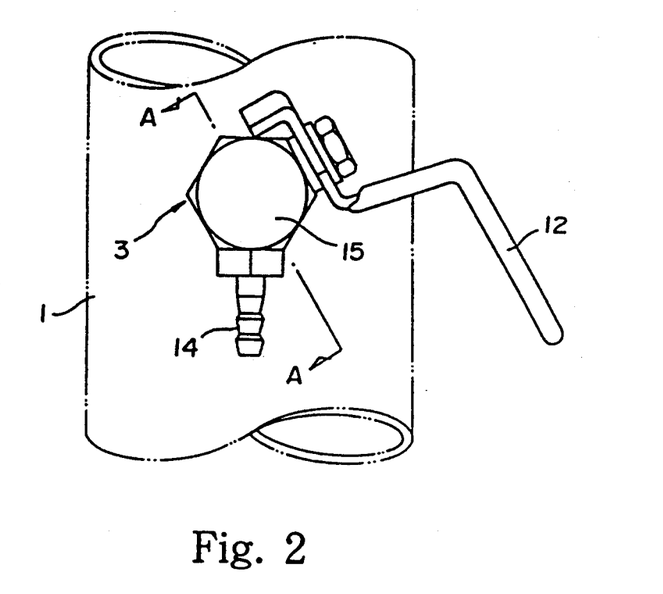
FIG. 2 is a front elevation view showing an example of a valve according to the present invention in an attached condition.
Figure 3:
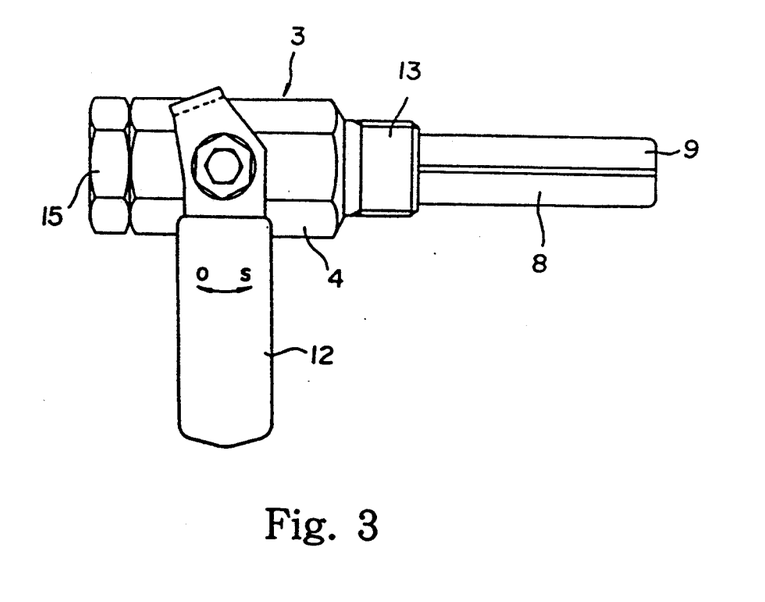
FIG. 3 is a side elevation view of the valve shown in FIG. 2.
Figure 4:
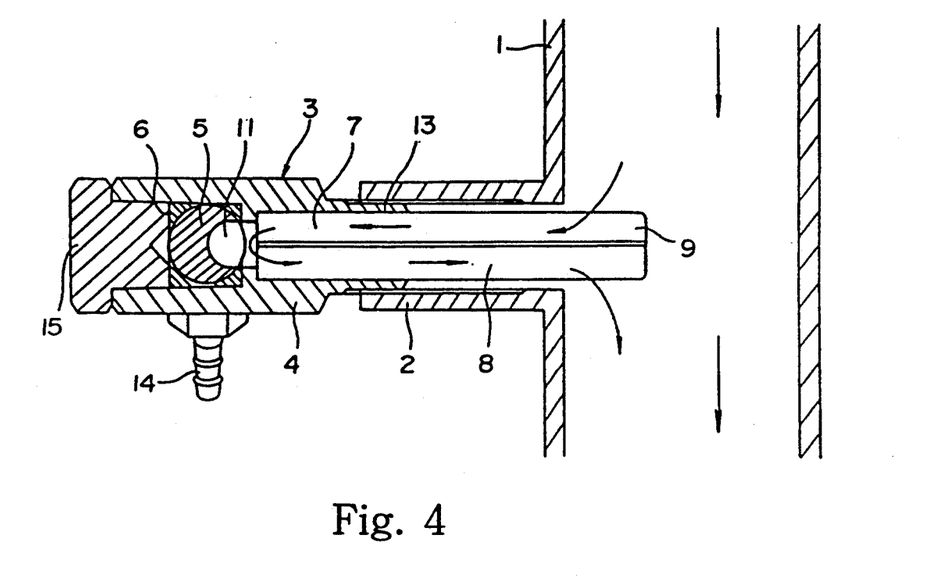
FIG. 4 is a sectional view taken along line A-A of FIG. 2 when the valve ball is closed.
Figure 5:
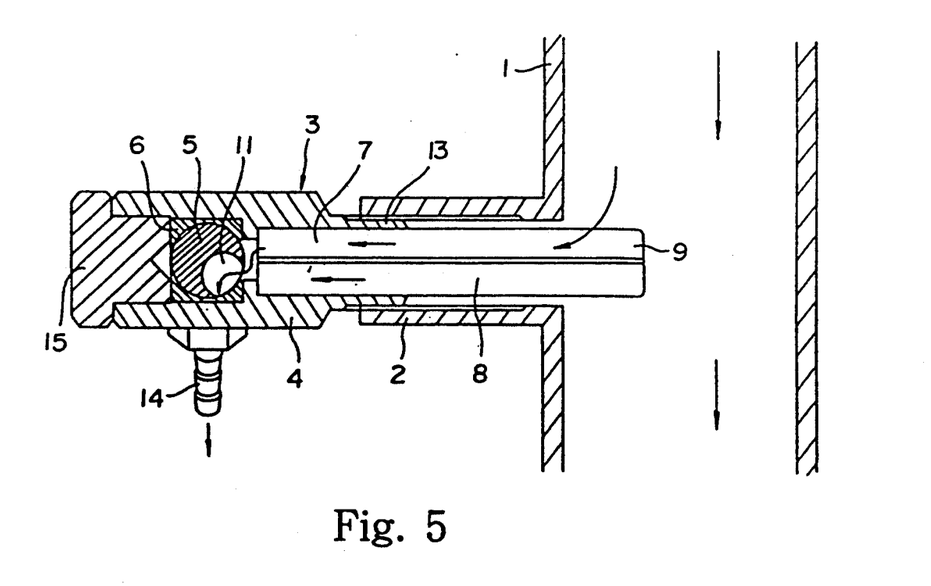
FIG. 5 is a sectional view taken along line A-A of FIG. 2 when the valve ball is open.
Figure 6:
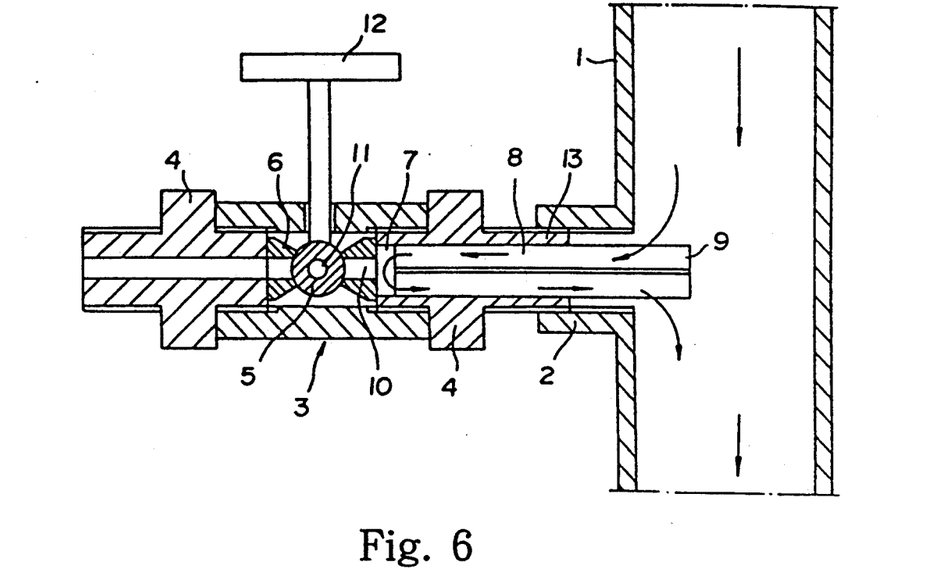
FIG. 6 is a sectional view showing another embodiment of the valve of the present invention.
Figure 7:
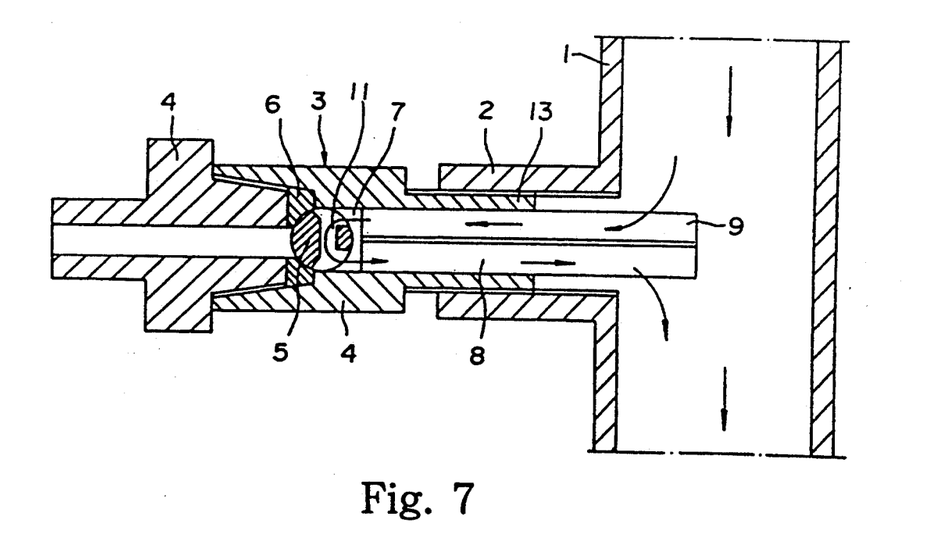
FIG. 7 is a sectional view showing another embodiment of the valve of the present invention.
Figure 8:
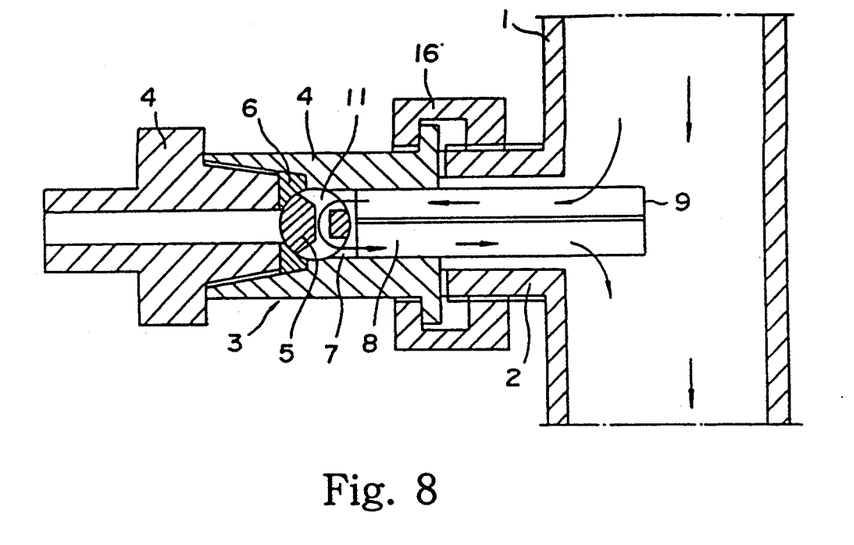
FIG. 8 is a sectional view showing still another embodiment of the valve of the present invention.
Figure 9:
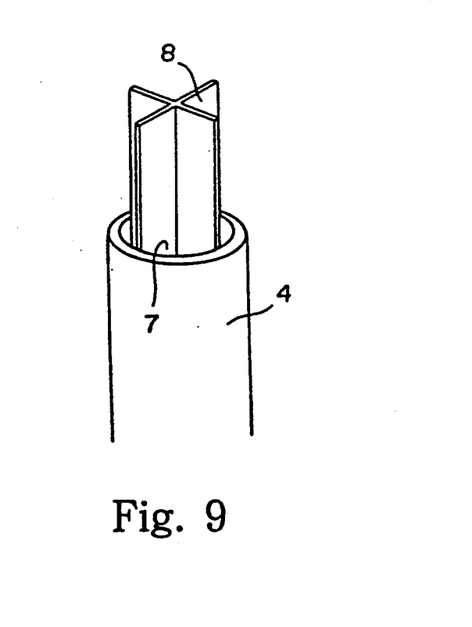
FIG. 9 is a perspective view showing an example of the diversion member.
Figure 10:
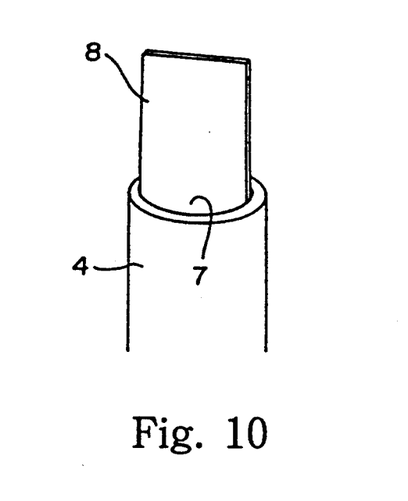
FIG. 10 is a perspective view showing another example of the diversion member.
Figure 11:
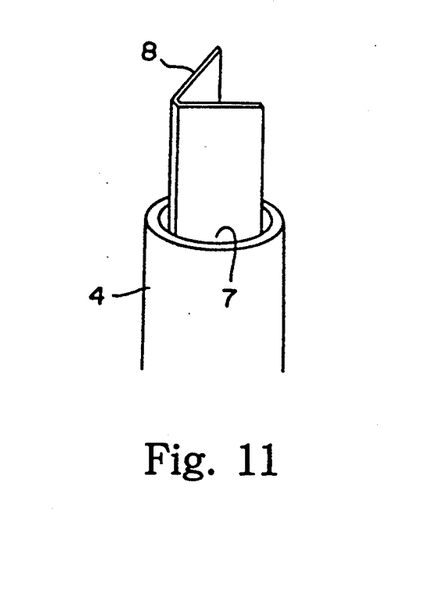
FIG. 11 is a perspective view showing another example of the diversion member.

FIG. 2 is a front elevation view showing an example of a valve according to the present invention in an attached condition, FIG. 3 is a side elevation view of the valve shown in FIG. 2, FIG. 4 is a sectional view taken along line A—A of FIG. 2 when the valve ball is closed, FIG. 5 is a sectional view taken along line A—A of FIG. 2 when the valve ball is open, FIG. 6 is a sectional view showing another embodiment of the valve of the present invention, FIG. 7 is a sectional view showing still another embodiment of the valve of the present invention, FIG. 8 is a sectional view showing still another embodiment of the valve of the present invention, and FIGS. 9 to 11 are perspective views showing examples of the diversion member.

Referring to FIGS. 2 to 11, reference numeral 1 denotes a main pipe through which liquid such as ultra pure water flows, 2 denotes a branch pipe provided for the main pipe 1, and 3 denotes a valve connected to an end portion of the branch pipe 2.

The valve 3 includes, similar to a conventional valve, an outer side valve case 4, a valve ball 5 provided in the valve case 4, and a valve seat 6 in which the valve ball 5 is accommodated. A liquid passageway 7 is formed in the valve case 4.

According to the present invention, a diversion member 8 which divides the inside of the liquid passageway 7 into a plurality of chambers along the flow of liquid so that the flow of liquid is diverted is inserted in the liquid passageway 7 in the valve case 4 of the valve 3 of the construction described above, and the end portion 9 of the diversion member 8 extends into the main pipe 1.

The diversion member 8 may be of the type shown in FIG. 9 wherein a pair of rectangular diversion plates cross each other at or in the proximity of the center of the diversion member 8 so that the inside of the liquid passageway 7 having a cylindrical cross section is divided into four chambers, or may be of the type shown in FIG. 10 which includes a single diversion plate which divides the inside of the liquid passageway 7 into two chambers.

Alternatively, the diversion member 8 may be constructed as shown in FIG. 11 wherein a single diversion plate is bent so as to have an L-shaped cross section and is inserted in the liquid passageway 7 to divide the inside of the liquid passageway into three chambers. The diversion member 8 may also be of the tubular type such as a conventional pitot tube (not shown).

It is to be noted that, whichever diversion member 8 described above is employed, it should always be disposed so that the end portion 9 thereof extends into the main pipe 1.

In the embodiment shown in FIGS. 2 to 5, the valve 3 is constructed so that, when a handle 12 provided on an outer peripheral portion of the valve case 4 is turned by a fixed angle, the spherical valve ball 5 in the valve case 4 is turned by the fixed angle so that the flow passageway 11 is formed in the valve ball 5.

An external thread corresponding to an internal thread formed on the inner periphery of the branch pipe 2 is formed on the outer periphery of the tubular portion 13 at an end of the valve case 4. By screwing the external thread into the branch pipe 2, the valve 3 is fixed to the branch pipe 2 in such a manner that the end portion 9 of the diversion member 8 inserted in the liquid passageway 7 extends into the main pipe 1.

FIG. 4 illustrates a condition wherein the handle 12 is operated to turn the valve ball 5 so as to close the flow passageway 11. In this condition, liquid flowing in the main pipe 1 is introduced into the liquid passageway 7 in the valve case 4 under the guidance of the diversion member 8 and turns back at the terminal end of the diversion member 8 so that it thereafter flows back into the main pipe 1 through, for example, a lower flow passageway defined by the diversion member 8.

It is to be noted that, in the present embodiment, since the flow passageway 11 of the valve ball 5 communicates with the flow passageway 7 when the valve ball 5 is closed, liquid can be prevented from stagnating in the valve ball 5.

FIG. 5 illustrates another condition wherein the handle 12 is turned to open the valve ball 5. In this condition, liquid flowing in the main pipe 1 passes through the liquid passageway 7 in the valve case 4 and through the flow passageway 11 of the valve ball 5 so that a necessary amount can be collected from the liquid collection pipe 14 provided on the valve case 4. It is to be noted that reference numeral 15 in FIGS. 2 to 5 denotes an end cap which makes up a part of the valve case 4.

The embodiment shown in FIG. 6 is constructed in such a manner that the tubular portion 13 at an end of the valve case 4 is screwed into the branch pipe 2 and the end portion 9 of the diversion member 8 inserted in the liquid passageway 7 in the valve case 4 extends into the main pipe 1.

Even when the handle 12 is turned to close the flow passageway 11 of the valve ball 5, liquid flowing in the main pipe 1 is introduced into the liquid passageway 7 under the guidance of the diversion member 8 and turns back at the terminal end of the diversion member 8 so that it thereafter flows back into the main pipe 1 through, for example, a lower flow passageway defined by the diversion member 8. Accordingly, liquid can be effectively prevented from stagnating in the branch pipe 2 and liquid passageway 7.

It is to be noted that, in order to collect liquid flowing in the main pipe 1, the handle 12 is turned to establish communication between the passageway 10 provided in the valve seat 6 and flow passageway 11 of the valve ball 5 so that liquid can be collected from the liquid collection opening of the valve case 4.

The valve ball 5 of the embodiments shown in FIGS. 7 and 8 has a spherical profile similar to the valve balls of the embodiments described above, and the flow passageway 11 of the valve ball 5 can be switched by turning a handle not shown.

In addition, in the present embodiments, when the valve ball 5 is closed, liquid flowing in the branch pipe 2 and liquid passageway 7 also flows through the flow passageway 11 of the valve ball 5, and consequently, liquid flowing in the main pipe I can be prevented from stagnating in the branch pipe 2, liquid passageway 7, and valve ball 5.

In particular, while the diversion member 8 is inserted in the liquid passageway 7 in the valve case 4 similarly as in the embodiments described above, in the embodiments shown in FIGS. 7 and 8, the flow passageway 11 which allows liquid to flow in the valve ball 5 when the valve ball 5 is in a closed condition is formed in the valve ball 5. Due to this construction, liquid flowing in the main pipe 1 and introduced into the branch pipe 2 and liquid passageway 7 is allowed to flow back into the main pipe 1 through the flow passageway 11 of the valve ball 5 and through, for example, a lower flow passageway defined by the diversion member 8. Consequently, liquid can be prevented from stagnating.

It is to be noted that, in the embodiment shown in FIG. 7, the tubular portion 13 at the end of the valve case 4 is screwed into the branch pipe 2 and the valve 3 is attached to the branch pipe 2 of the main pipe 1, but in the embodiment shown in FIG. 8, a union nut 16 is employed that extends between the outer peripheries of the branch pipe 2 and valve case 4 to connect them to each other.

The valve having the function to prevent liquid stagnation according to the present invention has the construction and operation as described above, and even when the valve ball is closed, since a bypass flow passageway is formed wherein liquid flowing in the main pipe is introduced into and flows through the branch pipe and the liquid passageway provided in the valve under the guidance of the diversion member, and then flows back into the main pipe, liquid can be prevented from stagnating, and accordingly, the various problems of the prior art arising from liquid stagnation in the branch pipe and the liquid passageway are eliminated.

Accordingly, while conventionally the valve ball must be opened for a little while to blow down stagnant water before liquid flowing in the main pipe is collected, the present invention confers a great benefit in that water can be collected immediately after the valve ball is opened.

Although variations of the embodiments described above are possible, the scope of the present invention is defined in the appended claims.

What is claimed is:

1. A valve provided for a branch pipe connected to a main pipe which has a function of preventing liquid flowing through a liquid flow passageway of said main pipe form stagnating within said branch pipe and said valve upon the closing of said valve, said valve comprising:
    a valve case connected to an end portion of said branch pipe;
    a flow passageway formed within said valve case through which said liquid flowing through said liquid flow passageway of said main pipe flows, a first end portion of said flow passageway extending into said liquid flow passageway of said main pipe;
    a diversion member mounted within said valve case so as to divide said flow passageway into a plurality of chambers along a direction of liquid flow; and
    a valve ball formed at a second end portion of said flow passageway and having an opening therethrough, said valve ball being rotatable into a first position and a second position such that when said valve ball is rotated into said first position, liquid flowing through said liquid flow passageway of said main pipe flows through a first chamber of said flow passageway in a first direction and through said opening to exit said valve, and when said valve ball is rotated into said second position, liquid flowing through said liquid flow passageway of said main pipe flows through said first chamber of said flow passageway in said first direction, through said opening, and back through a second chamber of said flow passageway in a direction opposite to said first direction so as to flow back into said liquid flow passageway of said main pipe, thereby continuously circulating said liquid and preventing stagnation thereof.

* * * * *

UNITED STATES PATENT AND TRADEMARK OFFICE
CERTIFICATE OF CORRECTION

PATENT NO. : 5,311,904
DATED : May 17, 1994
INVENTOR(S) : Takashi BEPPU

It is certified that error appears in the above-indentified patent and that said Letters Patent is hereby corrected as shown below:

On the title page, Item [54] and Column 1, Lines 2-3, the title should read as follows:

--VALVE FOR PREVENTING LIQUID FROM STAGNATING--

Signed and Sealed this

Twenty-third Day of August, 1994

*Attest:*

BRUCE LEHMAN

*Attesting Officer*  *Commissioner of Patents and Trademarks*